United States Patent
Maierhofer et al.

(10) Patent No.: US 12,152,973 B2
(45) Date of Patent: Nov. 26, 2024

(54) APPARATUS AND METHOD FOR DETECTING OBJECTS

(71) Applicant: ams AG, Premstätten (AT)

(72) Inventors: Paul Maierhofer, Graz (AT); Alexander Bergmann, Graz (AT); Anton Buchberger, Graz (AT)

(73) Assignee: AMS AG, Premstätten (AT)

( * ) Notice: Subject to any disclaimer, the term of this patent is extended or adjusted under 35 U.S.C. 154(b) by 241 days.

(21) Appl. No.: 17/778,231

(22) PCT Filed: Nov. 12, 2020

(86) PCT No.: PCT/EP2020/081927
§ 371 (c)(1),
(2) Date: May 19, 2022

(87) PCT Pub. No.: WO2021/099207
PCT Pub. Date: May 27, 2021

(65) Prior Publication Data
US 2023/0349804 A1  Nov. 2, 2023

(30) Foreign Application Priority Data
Nov. 22, 2019 (EP) .................................. 19211018

(51) Int. Cl.
*G01N 15/0205* (2024.01)
*G01N 15/00* (2024.01)

(52) U.S. Cl.
CPC . *G01N 15/0205* (2013.01); *G01N 2015/0046* (2013.01)

(58) Field of Classification Search
CPC ....... G01N 15/0205; G01N 2015/0046; G01N 15/075; G01N 2015/1486
See application file for complete search history.

(56) References Cited

U.S. PATENT DOCUMENTS

| 5,037,202 A | 8/1991 | Batchelder et al. |
| 5,345,306 A | 9/1994 | Ichimura et al. |

(Continued)

FOREIGN PATENT DOCUMENTS

| DE | 102006013345 B4 | 4/2009 |
| EP | 1953529 A1 | 8/2008 |

(Continued)

OTHER PUBLICATIONS

Extended European Search Report in corresponding European Application No. 19211018.7 mailed on Jul. 1, 2020, 12 pages.

(Continued)

*Primary Examiner* — Tarifur R Chowdhury
*Assistant Examiner* — Carlos Perez-Guzman
(74) *Attorney, Agent, or Firm* — MH2 Technology Law Group LLP

(57) ABSTRACT

An apparatus for detecting objects comprises an optical interferometer that is configured to receive electromagnetic radiation from a light source, and emit electromagnetic radiation to a detector. The optical interferometer is coupled to an environment and further configured to respond to objects in the environment intruding into an interaction volume of the optical interferometer by varying an intensity of the electromagnetic radiation emitted to the detector based on a property of the objects in the interaction volume. A signal processor is configured to generate an output signal based on the intensity of the electromagnetic radiation emitted to the detector.

15 Claims, 5 Drawing Sheets

(56) References Cited

U.S. PATENT DOCUMENTS

| | | |
|---|---|---|
| 5,561,515 A | 10/1996 | Hairston et al. |
| 5,793,485 A | 8/1998 | Gourley |
| 9,417,147 B2 | 8/2016 | Fischer et al. |
| 2006/0066867 A1* | 3/2006 | Beausoleil .............. H01S 5/026 |
| | | 356/481 |
| 2008/0186503 A1* | 8/2008 | Kiesel .................. G01N 21/031 |
| | | 356/454 |
| 2017/0325693 A1* | 11/2017 | Fukui ................... A61B 5/0275 |
| 2018/0003706 A1* | 1/2018 | Trenholm .............. G01N 21/45 |
| 2018/0038781 A1 | 2/2018 | Matsuda et al. |
| 2018/0164214 A1* | 6/2018 | Rottenberg ............ G01N 21/31 |
| 2020/0386680 A1* | 12/2020 | Bertacco ............ G01N 21/1717 |
| 2021/0270719 A1* | 9/2021 | Krausz ............... G01N 15/1434 |
| 2021/0389115 A1* | 12/2021 | Bang .................. G01B 9/02044 |

FOREIGN PATENT DOCUMENTS

| | | |
|---|---|---|
| EP | 3499215 A1 | 6/2019 |
| WO | 2007020272 A2 | 2/2007 |
| WO | WO-2012099848 A1 * | 7/2012 ............ B01L 3/5027 |
| WO | 2015021332 A1 | 2/2015 |

OTHER PUBLICATIONS

International Search Report and Written Opinion in corresponding International Application No. PCT/EP2020/081927 mailed on Feb. 5, 2021, 14 pages.

Jiang, Bei et al., "Continuous detection of micro-particles by fiber Bragg grating Fabry-Perot flow cytometer", Optics Express, vol. 26, No. 10, May 14, 2018, 6 pages.

Pettit Donald R. et al., "Coherent Detection of Scattered Light from Submicron Aerosols", Aerosol Science and Technology, Jun. 5, 2007, 19 pages.

Batchelder, J.S. et al., "interferometric detection of forward scattered light from smaH particles", Applied Physics Letters, 1989, vol. 55, No. 215, 4 pages.

European Examination Report issued in corresponding European Patent Application No. 19211018.7 dated Aug. 21, 2024, 4 pages.

* cited by examiner

APPARATUS AND METHOD FOR DETECTING OBJECTS

CROSS-REFERENCE TO RELATED APPLICATIONS

The present application is the national stage entry of International Patent Application No. PCT/EP2020/081927, filed on Nov. 12, 2020, and published as WO 2021/099207 A1 on May 27, 2021, which claims the benefit of priority of European Patent Application No. 19211018.7, filed on Nov. 22, 2019, all of which are incorporated by reference herein in their entireties.

The present disclosure relates to an apparatus for detecting objects and to a method for detecting objects. Specifically, the disclosure employs an optical interferometer with an interaction volume.

Most low-cost state of the art optical particle detectors rely on detecting light that is scattered from objects or particles that are located in a sampling volume. Such particle detectors typically employ a light source, such as a laser, for illuminating the objects or particles in the sampling volume and a photodetector arranged at a certain scattering angle with respect to optical axis defined by the path between a light source and the sampling region. The photodetector is thus configured to detect the amount of light that is scattered from the objects or particles in the sampling volume at said scattering angle. The resulting signal is proportional to the particle number concentration within the sampling volume and contains information on the size of the particles.

The state of the art particle detectors have a number of disadvantages. Firstly, most of the scattered light is lost and does not contribute to the signal as the photodetector is only configured to measure scattered light at a single certain scattering angle. Moreover, in typical scattering the bulk of the light is scattered in a forward direction, i.e. further along the optical axis, and typically cannot be discriminated from the incident light beam. In addition, light that is absorbed by the particles is also lost and does not contribute to the signal.

Furthermore, for actual particle detection, the index of refraction has to be known or assumed for every particle in the sampling region. Also, conventional particle detectors require a minimum particle size in the order of 200 to 300 nm, which is larger than many types of particles of interest for such detectors, such as soot particles that have a diameter of around 20 nm to 100 nm and are thus not detectable by conventional detectors.

An object to be solved is to provide an improved concept of an apparatus for detecting objects and/or particles and of a method for detecting such objects and/or particles.

This object is achieved with the subject-matter of the independent claims. Embodiments and developments of the improved concept are the subject-matter of the dependent claims.

The improved concept is based on the idea of introducing objects or particles that are to be detected into an interaction volume of an optical interferometer and subsequently detecting the change in the interference signal caused by a change in the effective path length of the optical interferometer and extinction of light. As such a change of the effective path length in an optical interferometer can be detected with tremendous sensitivity, even objects as small as nanoparticles can be potentially detected with an apparatus according to the improved concept. Specifically, the improved concept can be applied to free space as well as to waveguide-based interferometers.

An apparatus for detecting objects according to the improved concept comprises an optical interferometer that is configured to receive electromagnetic radiation from a light source, and emit electromagnetic radiation to a detector. Therein, the optical interferometer is coupled to an environment and further configured to respond to objects in the environment intruding into an interaction volume of the optical interferometer by varying an intensity of the electromagnetic radiation emitted to the detector based on a property of the objects in the interaction volume. The apparatus further comprises a signal processor that is configured to generate an output signal based on the intensity of the electromagnetic radiation emitted to the detector.

The electromagnetic radiation is light from a light source that is provided to the optical interferometer, for instance. For example, the light source is comprised by the apparatus. Alternatively, the light source is an external light source. The electromagnetic radiation can be monochromatic, e.g. a laser beam, or is broadband, e.g. light from an LED.

Analogous to the light source, the detector can either be comprised by the apparatus or be an external detector. Depending on the type of optical interferometer employed, the detector can be a single detector or a detector array having multiple detector channels, such as a balanced detector. For monochromatic light sources, the detector can be a photodetector such as a photodiode. For broadband electromagnetic radiation, the detector can be a spectrometer.

The optical interferometer serves the purpose of emitting the electromagnetic radiation to the detector with an intensity that depends on a property of objects that intrude into an interaction volume of the interferometer. The interaction volume is a part of the interferometer at which objects can interact with the electromagnetic radiation that is coupled into the interferometer. For example, the intensity emitted to the detector deviates from a standard intensity, e.g. a predefined intensity which may be zero, if objects are located in or traverse the interaction volume, whereas the standard intensity is emitted to the detector in the case that no object is present in or traverses the interaction volume. The property of the objects can be a number and/or a size of the objects. In other words, an effective path length of the interaction volume can depend on a number and/or on a size of the objects intruding into the interaction volume.

The signal processor, for example, comprises an evaluation circuit that is configured to generate the output signal based on a signal generated by the detector based on the detected intensity of the electromagnetic radiation emitted to the detector. The output signal can be provided to a further processor for generating an output value indicating a presence of objects in the interaction volume and/or a measurement of the property of the objects, for instance. The further processor can be comprised by the apparatus or be an external processor.

In some embodiments, the apparatus further comprises an instrument for generating a fluid flow through the interaction volume.

The apparatus in these embodiments further features an instrument for deliberately directing objects towards and through the interaction volume. For example, a pump or a fan structure generates a fluid stream that is directed from the instrument towards the interaction volume. Optionally, the instrument further comprises a particle transfer unit for directing a specific species of objects towards the interaction volume. Furthermore, for a well-defined flow, the instrument can comprise a nozzle for ejecting objects from the instrument towards the interaction volume in a well-defined manner, e.g. with a constant velocity. With a laminar flow, turbulences can be avoided in the interaction volume, for instance.

In some embodiments, the optical interferometer is further configured to operate at a predetermined operating point if the interaction volume is free of objects.

The operating point of the interferometer can be set such that in the absence of objects in the interaction volume, a predefined intensity of electromagnetic radiation is emitted from the interferometer to the detector. To this end, the interferometer can be tuned, e.g. by means of adjusting a cavity length in relation to the wavelength of the light source, such that a specific operating point is achieved. For example, the operating point can be set such that minimum, near minimum or zero intensity is emitted to the detector if no objects are present in the interaction volume by realizing destructive interference of the interferometer.

Alternatively, said operating point can be set such that maximum or near maximum intensity is emitted to the detector if no objects are present in the interaction volume by realizing constructive interference of the interferometer.

For instance, the destructive interference condition for a Fabry-Pérot interferometer with a detector arranged in transmission is given by: $2*n*d=(m+1/2)*lambda$, whereas for a detector arranged in reflection it is given by: $2*n*d=m*lambda$. Therein, n is the index of refraction of a medium in the cavity, d is the distance between mirrors, lambda denotes the wavelength of the electromagnetic radiation, and m is a positive integer.

As the operating point of an interferometer generally depends on the refractive index of the medium in a cavity of the interferometer, slight changes in temperature, absolute pressure and/or the surrounding gas can significantly influence the operating point.

In order to compensate for such drifts, countermeasures such as a tunable or a broadband light source can be employed for providing the electromagnetic radiation to the interferometer. For broadband radiation, a spectrometer can be used as the detector, realized by using a photodiode array with thin film wavelength selective filters on top of each single photodiode, for instance. Hence, the transmission or reflection of an interferometer can be monitored as a function of the wavelength with such a spectrometer. Other solutions include standard realizations of spectrometers, e.g. by utilizing a diffraction grating or a prism. Alternatively, differential measurements with no fixed operating point can be performed.

In some embodiments, the interferometer is one of the following types of interferometers: Mach-Zehnder interferometer, Michelson interferometer, Sagnac interferometer, Twyman-Green interferometer, and Fabry-Perot interferometer. The interferometer can be a Fabry-Pérot-based interferometer comprising two mirrors facing each other and thus forming a cavity. The mirrors can be any combination of plane parallel, concentric focal, hemispherical, concave and convex. The cavity mirrors can be made of any standard material for optics, such as fused silica or $CaF_2$. Moreover, the mirrors can comprise a thin film coating, e.g. a gold or silver coating, for tuning the reflectivity of the mirrors. The reflectivity of each mirror can be in the range of 30% to over 99%, for instance. The size of the mirrors of the cavity can be approximately 300×300 $\mu m^2$ to 500 by 500 $\mu m^2$, thus having a relatively high ratio of particle cross-section to light beam cross-section in the interaction volume which is the cavity volume between the mirrors, for instance. The cavity length in these cases can be accordingly in the order of 0.3 mm to a few tens of millimeters.

For Fabry-Pérot-type interferometers operating in reflection mode, the interferometer can further comprise a beam-splitting element, such as a thin-film beam splitter or a prism with approximately 50/50 reflection and transmission.

Alternative solutions are interferometers that comprise multiple arms such as Michelson and Mach-Zehnder interferometers. In these interferometer types, the interaction volume can be located in one of the arms. The realizations of the interferometric setup are analogous to a Fabry-Perot-type interferometer.

In some embodiments, the interaction volume is a free space volume of the interferometer.

For example, in a Fabry-Perot, Michelson or Mach-Zehnder type free space interferometer, the propagation of the electromagnetic radiation occurs at least partially in free space, i.e. through a gaseous or through a vacuum volume. For example, the interaction volume is located in a free space cavity of a Fabry-Perot-type interferometer or in a free space path in one of the arms of a Michelson or Mach-Zehnder type interferometer.

Objects or particles intruding into the free space interaction volume alter the effective optical path length due to their refractive index being different from that of the medium in the interaction volume or alter the operating point of the interferometer through absorption of electromagnetic radiation. Thus, the presence of a particle can be detected due to a varying transmission and/or reflection of the interferometer.

In some embodiments, the interaction volume is an evanescent field region of a waveguide structure of the interferometer.

In these embodiments, the interferometer can be of one of the types described above and comprise a dielectric waveguide structure in which the electromagnetic radiation propagates through total internal reflection. To this end, a waveguide core with a higher refractive index than that of surrounding materials is employed. For such waveguide structures, the electromagnetic field at and outside the core interfaces does not vanish but decays exponentially in the surrounding material as an evanescent field. The evanescent field strength around the core can be tuned by altering the dimensions of the core and hence altering the ratio of electromagnetic field inside and outside the core. The core dimensions in a cross-section of the waveguide structure can be in the order of the wave length of the electromagnetic radiation, e.g. in the order of a few hundreds of nanometers.

Objects entering the evanescent field region interact with the electromagnetic field which influences the transmission of the waveguide structure through scattering and/or absorption processes, for instance. Also, a refractive index of the objects being different than that of the medium surrounding the waveguide structure induces a phase change, therefore also in this case altering the effective path length of the electromagnetic radiation through the waveguide.

In some embodiments, the optical interferometer operates in transmission or reflection.

Depending on the application and/or on the type of interferometer employed in the apparatus, the detector can be arranged for a measurement in transmission or in reflection.

For a Fabry-Perot-type interferometer, for example, in transmission the operating point can be set to a low level transmission but close to maximum transmission. In other words, the operating point can be near the flank of the the transmission function of the interferometer, e.g the Airy distribution function. If the reflected power is monitored, the operating point can be set to the maximum of the transmission function. Monitoring of the reflected power can be preferable for some interferometer types as the ground level signal at the detector can be achieved arbitrarily low in reflection while the maximum normalized transmission can in principle reach unity regardless of the finesse.

In some embodiments, the optical interferometer is configured to respond to objects with a minimum diameter of about 10 nm.

Due to the high sensitivity of optical interferometers, the detection of nanoparticles as small as 10 nm is possible with an apparatus according to the improved concept. This is an order of magnitude smaller than what can be achieved with conventional particle detectors that are based on light-scattering, for instance. Hence, an apparatus according to the improved concept can be employed for detecting objects such as anthropogenic and bio-aerosol particles, e.g. soot, fine dust, salt and pollen particles.

In some embodiments, the intensity of the electromagnetic radiation emitted to the detector is a function of size and/or refractive index of the objects intruding into the interaction volume.

The interferometer can be designed such that the emitted intensity is, for example, proportional or inversely proportional to the refractive index and/or the size of the objects. For example, this can be realized by providing an interferometer with an interaction volume that is characterized by a medium with a refractive index substantially different than that of the objects intruding into the interaction volume. For example, the interaction volume is an empty cavity or a cavity filled with air.

In some embodiments, the apparatus according to the improved concept further comprises a further interaction volume that is oriented parallel, or basically parallel, to the interaction volume, and a particle source emitting objects with a velocity that depends on a size of the objects. The objects emitted from the particle source intrude into the interaction volume and the further interaction volume.

As described above, the signal at the detector can be a function of particle size and the refractive index. If the size of the objects is known, the signal at the detector can be used to calculate the refractive index of the particle and vice versa.

In some further embodiments, the further interaction volume is comprised by a further optical interferometer that is coupled to the environment and configured to respond to objects in the environment intruding into the further interaction volume by varying in intensity of electromagnetic radiation emitted, by means of the further optical interferometer, to a further detector based on a property of the objects in the further interaction volume.

The object is further solved by a particle detector, in particular designed as an integrated device, comprising an apparatus for detecting objects according to one of the embodiments described above.

In order to have a maximum of stability with respect to vibrations and to have a smallest possible sensor e.g. for mobile applications, the sensor can be realized as follows: The particle detector device can comprise a substrate, a photodetector, a dielectric on, above or within the substrate, a source of electromagnetic radiation, and a through-substrate via in the substrate. The through-substrate via is exposed to the environment, in particular to ambient air. A waveguide is arranged in, above or within the dielectric so that the electromagnetic radiation emitted by the source of electromagnetic radiation is coupled into a portion of the waveguide. A further portion of the waveguide is opposite the photodetector, so that said portions of the waveguide are on different sides of the through-substrate via. By having the via also extending through the waveguide, the optical cavity is formed. A material such as gold can be sputtered onto the surfaces of the optical cavity formed by the waveguide and the via to increase the reflectivity.

If used in reflection, the system needs to have a beam splitter integrated in the waveguide. The beam splitter has to be situated after the source of radiation and before the optical cavity. The cavity can be etched into an optical fiber, similar to the via in the substrate. In fiber optics there are standard elements such as beam splitters and coupled light sources and detectors available which are used for example in telecommunication. Furthermore, the cavity can be formed by discrete elements which have to be fixed in a stable way.

The object is further solved by a method for detecting objects. The method comprises coupling an optical interferometer to an environment, receiving by means of the optical interferometer electromagnetic radiation from a light source, and emitting by means of the optical interferometer electromagnetic radiation to a detector. The method further comprises varying in intensity of the electromagnetic radiation emitted to the detector based on a property of objects intruding from the environment into an interaction volume of the optical interferometer. The method further comprises generating an output signal based on the intensity of the electromagnetic radiation emitted to the detector.

Further embodiments of the method for detecting objects become apparent to a person skilled in the art from the embodiments of the apparatus described above.

The improved concept will be described in more detail in the following with the aid of drawings. Elements having the same or similar function bear the same reference symbols throughout the drawings. Hence, the description is not necessarily repeated in the description of the following drawings.

Figure 1:
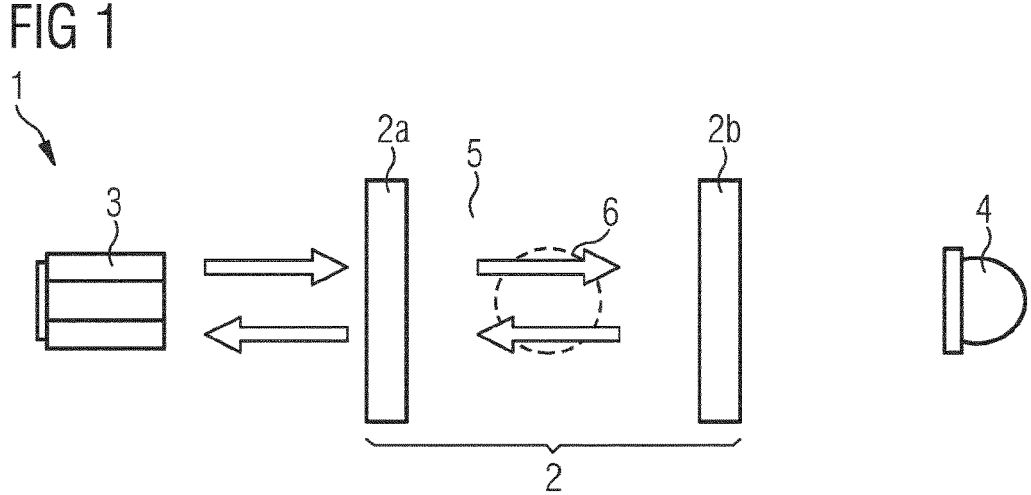
FIGS. 1 and 2 show an exemplary embodiment of an apparatus for detecting objects according to the improved concept.

FIG. 1 shows an exemplary embodiment of an apparatus 1 for detecting objects according to the improved concept. In this embodiment, the apparatus 1 comprises a Fabry-Perot type interferometer 2 having two mirrors 2a, 2b that form a Fabry-Perot cavity enclosing a free space interaction volume 5. The mirrors 2a, 2b are thus optical cavity mirrors and can be made of any standard material for optics, such as fused silica or CaF2. Optionally, the mirrors 2a, 2b can comprise a thin film coating, such as a gold or a silver coating, for tuning the reflectivity.

The apparatus 1 further comprises a light source 3, e.g. a monochromatic light source such as a laser light source, and a detector 4. For example, the light source 3 is a VCSEL, a NdYAG, a HeNe laser, a diode laser, a distributed feedback laser. Alternatively, the light source 3 can be an LED. In alternative embodiments, the light source 3 can be a broadband light source. The detector can be realized as a photo diode or as a single photon avalanche diode, for instance.

The light source 3 emits electromagnetic radiation, e.g. visible light, towards the first mirror 2a of the interferometer 2. The mirrors 2a, 2b are characterized by a reflectivity that is less than 1. In other words, a certain amount of electromagnetic radiation is transmitted by the mirrors 2a, 2b. For example, the reflectivity of the mirrors 2a, 2b are between 30% and above 99%. The reflectivities of the mirrors 2a, 2b can be the same or be different from each other. Due to this, electromagnetic radiation is coupled into the cavity and circulates between the mirrors 2a, 2b of the interferometer 2. Behind the second mirror 2b the detector 4 is arranged and configured to detect the electromagnetic radiation that is emitted from the interferometer 2 through the second mirror 2b. Hence, the embodiment shown features an optical interferometer 2 that operates in transmission.

The interferometer 2 is aligned such that in the absence of objects in the interaction volume 5, the electromagnetic radiation within the cavity interacts destructively such that no or nearly no electromagnetic radiation is coupled out through the second mirror 2b towards the detector 4. This is also often referred to as a dark-field configuration of the interferometer 2.

The embodiment further features an instrument 6 for generating a fluid flow through the interaction volume 5. For example, the instrument 6 creates an airstream of objects 10 using a pump and/or a nozzle such that the objects 10 traverse the interaction volume 5. In the drawing, the airstream is directed into or out of the plane of the drawing. The fluid flow can aid in directing wanted objects 10 intentionally towards the interaction volume 5 for enhancing the efficiency of the apparatus 1. Also, in some embodiments, depending on the interferometer type and readout scheme, the sensitivity to moving objects 10 can be larger compared to that of stationary objects 10.

The apparatus 1 further comprises a signal processor for generating an output signal based on the signal detected by the detector 4. For illustration purposes, the signal processor is not shown in the figure.

Figure 2:
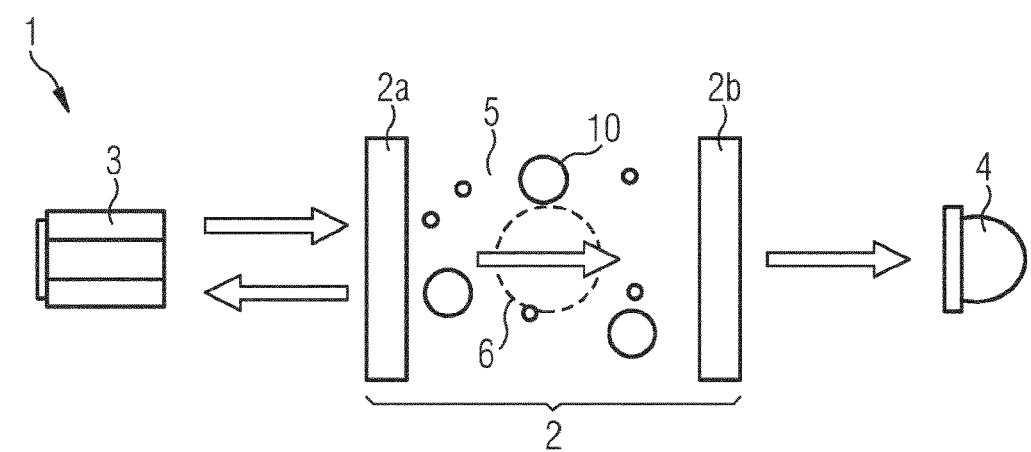

FIG. 2 shows the exemplary embodiment of the apparatus 1 shown in FIG. 1 with objects 10 inside the interaction volume 5, i.e. within the cavity of the interferometer 2. For example, the objects 10 are introduced via an airstream created by the instrument 6. The objects 10 influences the operation of the interferometer 2 in multiple manners. Firstly, due to scattering and/or absorption effects, light within the cavity is lost, hence disturbing the balance of the destructive interference. Secondly, due to the refractive index of the objects 10 being substantially different from that of a medium in the cavity, e.g. air, the effective optical path length is altered, i.e. increased, thus changing the operating point of the interferometer 2.

As a result, the intensity emitted from the interferometer 2 towards the detector 4 changes, e.g. increases. A signal at the detector 4 being different from that of an empty cavity thus indicates the presence of objects 10. It is apparent that the larger the number of objects 10 and/or the larger the size of the objects 10, the higher is the disturbance and hence the larger is the signal at the detector 4. In other words, the signal at the detector 4 in this embodiment of the apparatus is a function of, e.g. proportional to, object size and/or number.

Figure 3:
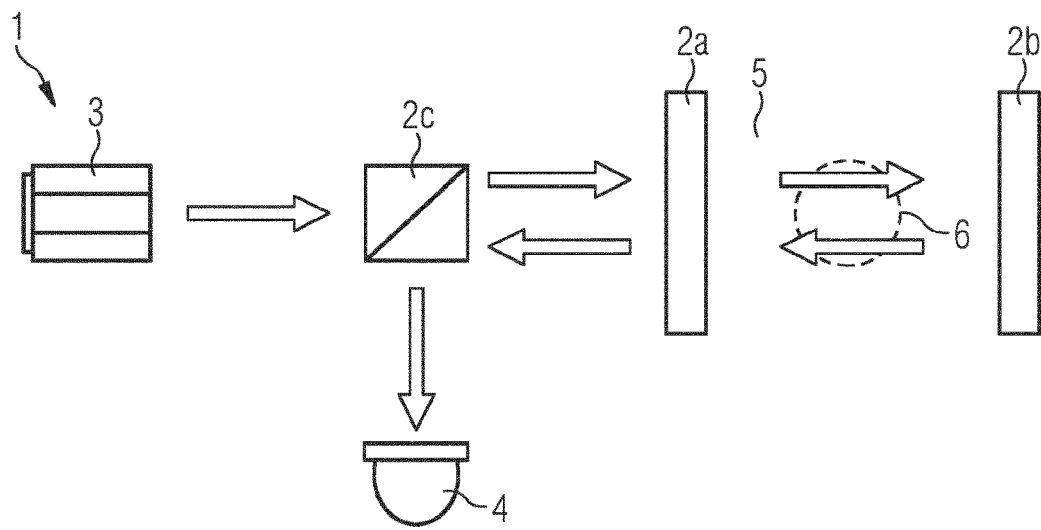
FIG. 3 shows a further exemplary embodiment of an apparatus for detecting objects.

FIG. 3 shows a further exemplary embodiment of an apparatus 1 that is based on that shown in FIG. 1. In contrast to the latter, in this embodiment the interferometer 2 operates in reflection. In other words, the detector 4 is arranged on the same side of the Fabry-Perot cavity as the light source 3. In order to distinguish between input and output radiation, a beam splitter 2c is employed such that no input radiation is detected by the detector 4. For example, the beam splitter is a thin film beam splitter or a prism with for example 50-50 reflection and transmission.

In contrast to the embodiment shown in FIGS. 1 and 2, the preferred dark-field configuration in this embodiment means that the cavity of the interferometer 2 is aligned such that in case of an empty cavity, i.e. in the absence of objects 10 in the interaction volume 5, the transmission at the second mirror 2b is maximum. This way, no or substantially no radiation exits the cavity via the first mirror 2a and reaches the detector 4. Apart from this, the working principle of this embodiment is similar to that shown in the previous figures.

Figure 4:
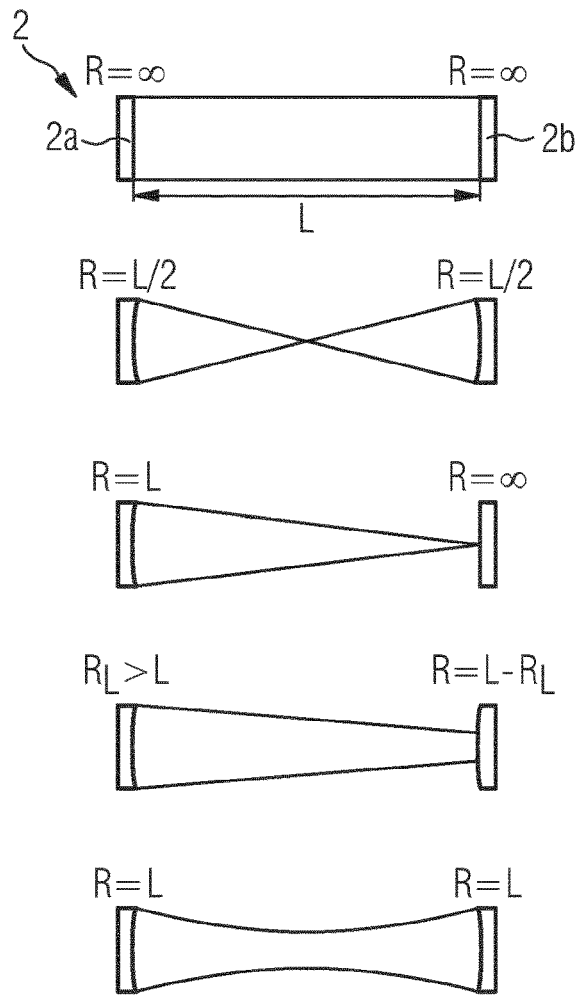
FIG. 4 shows various cavity configurations of an interferometer employed in an exemplary embodiment of an apparatus for detecting objects.

FIG. 4 shows various cavity configurations of a Fabry-Perot type interferometer 2 employed in an apparatus 1 according to the improved concept. As shown in the Figure from top to bottom, the cavity mirrors 2a, 2b can be chosen to be plane-parallel, concentric, spherical, of different types such as concave convex, or confocal. Typical cavity parameters include the cavity length L and the radius of curvature R of the cavity mirrors 2a, 2b. Depending on the choices, different beam wastes can be achieved at different locations within the cavity as illustrated. For example, a small beam waste is suitable for rendering the interferometer 2 sensitive to extremely small objects few tens of nanometers in diameter, such as soot particles.

Figure 5:
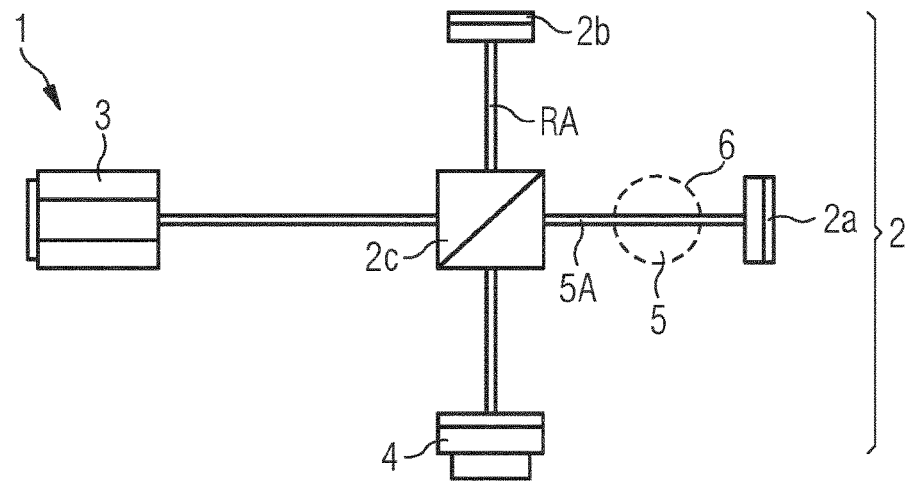
FIGS. 5 to 9 show further exemplary embodiments of an apparatus for detecting objects.

FIG. 5 shows a further exemplary embodiment of an apparatus 1 according to the improved concept. In this embodiment, the apparatus 1 comprises a Michelson type interferometer 2 comprising a beam splitter 2c and to end mirrors 2a, 2b forming two interferometer arms. The interaction volume 5 is located in one of the arms, the sensing arm SA, while the other arm, the reference arm RA, is free of any objects 10 at all times. Also in this embodiment, the detector 4 is arranged with respect to the beam splitter 2c such that no radiation is detected directly from the light source 3.

In a Michelson type interferometer, the distances of the mirrors 2a, 2b from the beam splitter 2c can be tuned to achieve a certain operating point of the interferometer 2. For example, the distances are tuned such that destructive interference occurs at the location of the beam splitter 2c, hence also in this case realizing a dark-field configuration wherein no or substantially no radiation reaches the detector 4 in case no objects 10 are located in or traverse the interaction volume 5. Analogous to the embodiments of FIGS. 1 to 3, this embodiment also features an instrument 6 for generating a fluid flow through the interaction volume 5.

Figure 6:
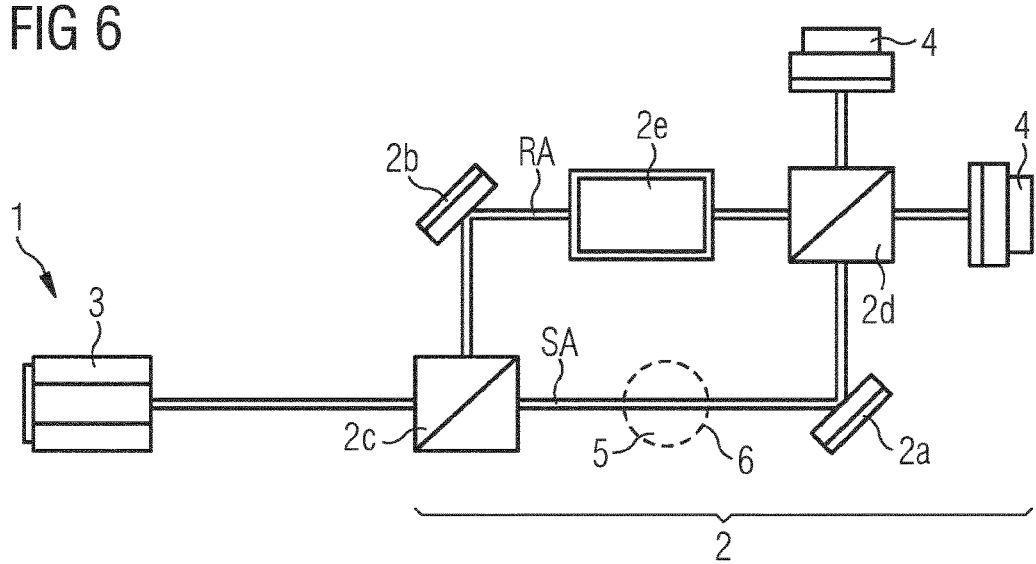

FIG. 6 shows a further exemplary embodiment of an apparatus 1 according to the improved concept. In this embodiment, the apparatus 1 comprises a Mach-Zehnder type interferometer 2 comprising two beam splitters 2c, 2d. The Mach-Zehnder interferometer 2 further comprises a phase shifting element 2e in the reference arm RA for shifting the phase in order to achieve a certain operating point. The embodiment further features two detectors 4 that each are arranged on one of the output sides of the second beam splitter 2d. However, either one of the detectors 4 is sufficient for efficient operation of the apparatus 1.

Analogous to the Michelson interferometer shown in the previous drawing, the interaction volume 5 is located in the sensing arm SA. Also in this case, the apparatus one can feature an instrument 6 for generating a fluid flow through the interaction volume 5 as mentioned before.

Figure 7:
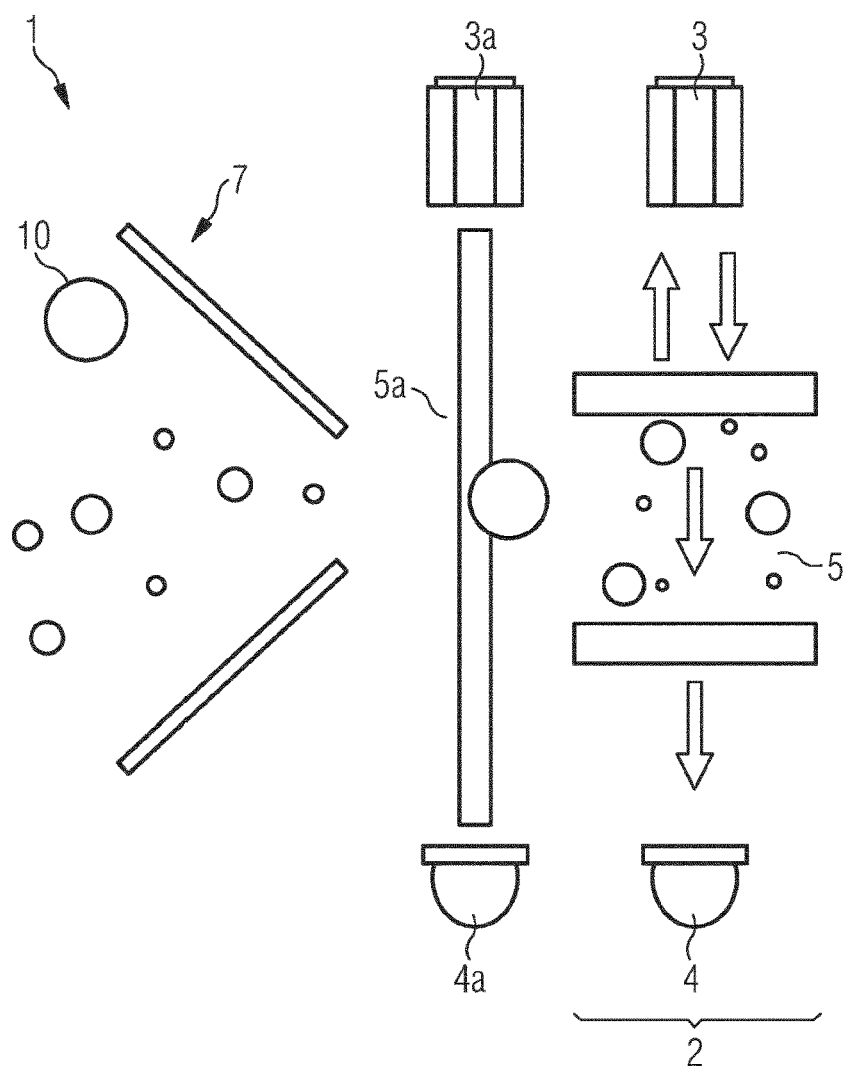

FIG. 7 shows a further exemplary embodiment of an apparatus 1 for detecting objects. In this embodiment, the apparatus 1 comprises a particle source 7 that is configured to emit objects 10 with a velocity that depends on a size of the objects 10. For example, this is realized via a nozzle on the output of the particle source 7. The aforementioned instrument 6 can be the nozzle, for instance.

The apparatus 1 further comprises a further interaction volume 5a that is oriented basically parallel to the interaction volume 5 of the interferometer 2. Therein, the interferometer 2 can be any interferometer type, such as those described in illustrated in the previous figures. The further interaction volume 5a is for example a light barrier realized by a further light source 3a and a further detector 4a arranged opposite of each other.

The particle source 7 is configured to emit the objects 10 such that the objects 10 traverse both the interaction volume 5 and the further interaction volume 5a. The order with which the interaction volumes 5, 5a are arranged with respect to the particle source 7 can be chosen arbitrarily.

As the final velocity of a particle after leaving a nozzle is a function of the aerodynamic particle size, the measured time difference between each object 10 traversing the interaction volume 5 and traversing the interaction volume 5a gives information of the particle size. Furthermore, as mentioned before, the signal at the detector 4 is a function of object size and refractive index of the object 10. Hence, if the object size is determined, e.g. via the time difference, the signal at the detector 4 can be used to calculate the refractive index of the object 10. Thus, different particle classes, such as soot, dust, salt or pollen, can be discriminated by size and refractive index using an apparatus 1 as shown.

In an alternative embodiment not shown, the further interaction volume 5a can be realized inside a further interferometer. This can further enhance the sensitivity of the object detection mechanism.

Figure 8:
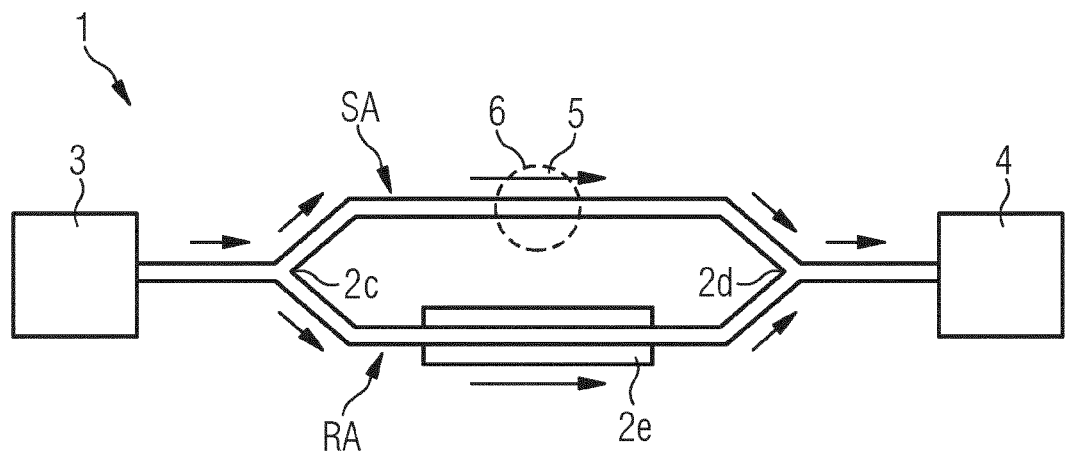

FIG. 8 shows an exemplary embodiment of an apparatus 1 comprising a waveguide based interferometer 2. The interferometer 2 is a Mach-Zehnder type interferometer. However, all interferometer types are possible. Also in this case, the interferometer 2 comprises two arms, a sensing arm SA and a reference arm RA, and two beam splitters 2c, 2d. For example, the beam splitter is a waveguide beam splitter or a directional coupler e.g. with 50-50 reflection and transmission. The interferometer 2 further comprises a phase shifting element 2e in the reference arm RA for shifting the phase in order to tune the system to a certain operating point.

The sensing arm SA features the interaction volume 5, e.g. realized by an uncladded waveguide core with cross-sectional dimensions that are in the order of the wavelength of electromagnetic radiation, e.g. in the order of 1 μm. Guiding light through such a waveguide means that a significant amount of light propagates as evanescent field, i.e. outside the waveguide. Also, for waveguide based interferometers, an instrument 6 can be employed to direct objects 10 towards the interaction volume 5.

Objects 10 that are located within this evanescent region, which is the interaction volume 5, alter the amount of light that is transmitted via scattering and/or absorption processes. Furthermore, due to a local change of the refractive index, also in this case the effective optical path length is altered, hence leading to a path length difference between the two interferometer arms. Due to these effects, the signal at the detector 4 changes from the operating point in case no objects 10 are located within the interaction volume 5.

Figure 9:
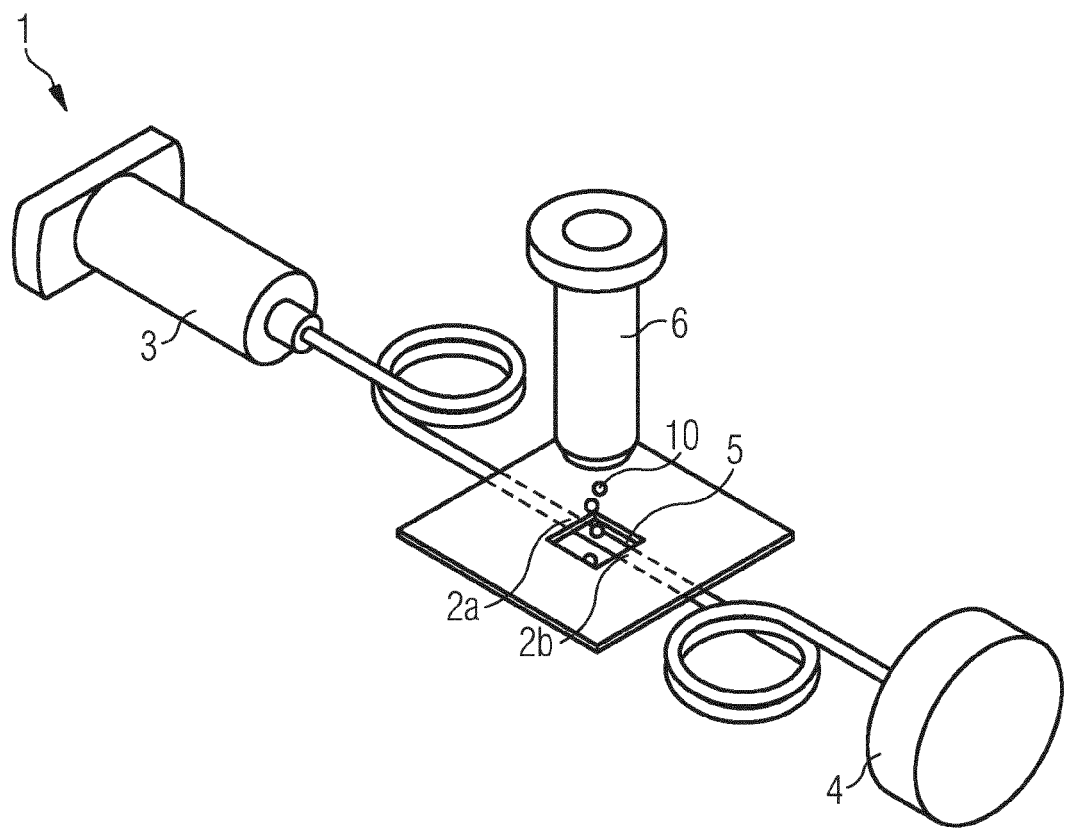

FIG. 9 shows a three-dimensional scheme of a further exemplary embodiment of an apparatus 1. In this embodiment, a free space cavity analogous to that illustrated in FIGS. 1 and 2 is formed via a gap between two waveguides. The cavity mirrors 2a, 2b therein are formed by end facets of the waveguides. A first waveguide directs light from the light source 3 towards the first mirror 2a, i.e. towards the cavity, while a second waveguide directs light from the second mirror 2b, i.e. from the cavity, towards the detector 4. The instrument 6 is arranged with respect to the interaction volume 5 such that objects 10 are directed towards and/or through the interaction volume 5.

Figure 10:
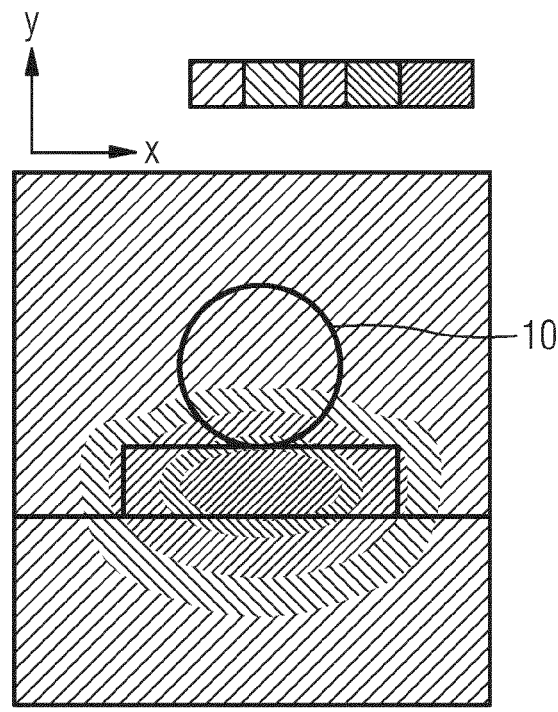
FIG. 10 illustrates the working principle of an exemplary embodiment of an apparatus for detecting objects comprising a waveguide based interferometer.

FIG. 10 illustrates the near-field around a waveguide and shows the electromagnetic field strength in cross-section. If an object 10 is located in the evanescent region of the waveguide, e.g. if an object 10 is adsorbed, the evanescent field is disturbed at the location of the object 10 leading to the effects mentioned above. In particular, the transmission in z-direction is influenced.

Figure 11:
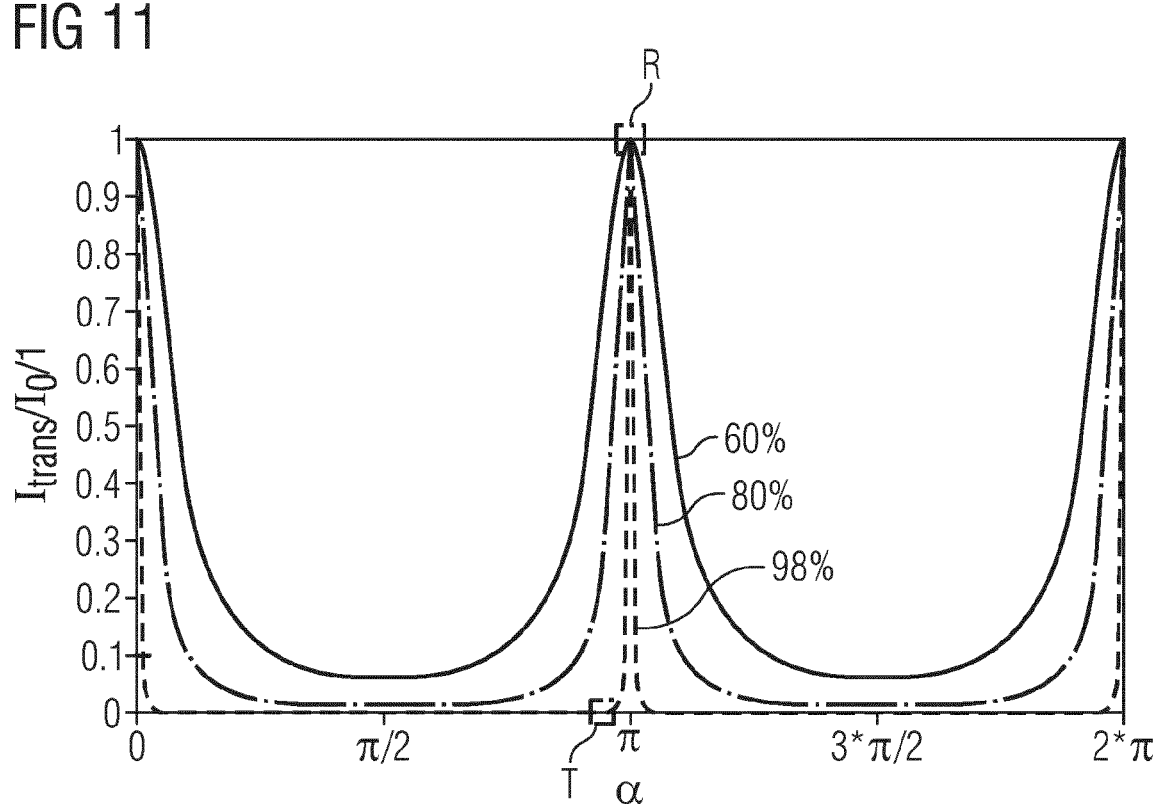
FIG. 11 illustrates suitable choices of operating points of an interferometer employed in an apparatus according to the improved concept.

FIG. 11 shows exemplary transmission functions of a Fabry-Perot type interferometer for different reflectivities of the mirrors 2a, 2b indicated as the percentage numbers in the figure. In the graph, the normalized transmission intensity is plotted versus phase angle α. For a detector configuration in transmission, a suitable operating point for the dark-field configuration is indicated as T in the figure for mirror reflectivities of 98%. The transmission operating point T is set to a low level transmission but close to maximum transmission. In other words, the operating point is chosen to be near the flank of the transmission function of the Fabry-Perot cavity.

In contrast, for a detector configuration in reflection, the reflection operating point R is preferably chosen to be the point of maximum transmission independent of the mirror reflectivities. In both cases, the presence of even small objects 10 can lead to a significant change of the interferometer's operating point and hence of the signal detected at the detector 4.

REFERENCE NUMERALS

1 apparatus
2 interferometer
2a, 2b mirror
2c, 2d beam splitters
2e phase shifting element
3, 3a source
4, 4a detector
5, 5a interaction volume
6 instrument
7 particle source
10 object
R reflection operating point
T transmission operating point
RA reference arm
SA sensing arm

The invention claimed is:

1. An apparatus for detecting objects, comprising
an optical interferometer that is configured to receive electromagnetic radiation from a light source; and emit electromagnetic radiation to a detector; wherein
the optical interferometer is coupled to an environment and further configured to respond to objects in the environment intruding into an interaction volume of the optical interferometer by varying an intensity of the electromagnetic radiation emitted to the detector based on a property of the objects in the interaction volume; and a signal processor configured to generate an output signal based on the intensity of the electromagnetic radiation emitted to the detector, wherein a further interaction volume of the optical interferometer is oriented basically parallel to the interaction volume, a particle source configured for emitting objects with a velocity that depends on a size of the objects, such that the objects emitted from the particle source intrude the interaction volume and the further interaction volume, and the signal processor is further configured to measure a time difference between an object traversing the interaction volume and traversing the further interaction volume, and a size of the object is determined from the measured time difference.

2. The apparatus according to claim 1, further comprising an instrument for generating a fluid flow through the interaction volume.

3. The apparatus according to claim 1, wherein the optical interferometer is further configured to operate at a predetermined operating point if the interaction volume is free of objects.

4. The apparatus according to claim 1, wherein the interferometer is of one of the following types of interferometers: Mach-Zehnder interferometer, Michelson interferometer, and Fabry-Pérot interferometer.

5. The apparatus according to claim 1, wherein an effective path length of the interaction volume depends on a number and/or on a size of the objects intruding into the interaction volume.

6. The apparatus according to claim 1, wherein the interaction volume is a free space volume of the interferometer.

7. The apparatus according to claim 1, wherein the interaction volume is an evanescent field region of a waveguide structure of the interferometer.

8. The apparatus according to claim 1, wherein the optical interferometer operates in transmission or reflection.

9. The apparatus according to claim 1, wherein the optical interferometer is configured to respond to objects with a minimum diameter of about 10 nm.

10. The apparatus according to claim 1, wherein the electromagnetic radiation is monochromatic; or the electromagnetic radiation is broadband and the detector is a spectrometer.

11. The apparatus according to claim 1, wherein the intensity of the electromagnetic radiation emitted to the detector is a function of size and/or refractive index of the objects intruding the interaction volume.

12. The apparatus according to claim 1, wherein the further interaction volume is comprised by a light barrier in between a further light source and a further detector arranged on opposite sides of the further interaction volume.

13. The apparatus according to claim 1, wherein the further interaction volume is comprised by a further optical interferometer that is coupled to the environment and configured to respond to objects in the environment intruding into the further interaction volume by varying an intensity of electromagnetic radiation emitted, by the further optical interferometer, to a further detector based on a property of the objects in the further interaction volume.

14. A particle detector, in particular designed as an integrated device, comprising an apparatus for detecting objects according to claim 1.

15. A method for detecting objects, the method comprising coupling an optical interferometer to an environment;

receiving by the optical interferometer electromagnetic radiation from a light source;

emitting by the optical interferometer electromagnetic radiation to a detector;

varying an intensity of the electromagnetic radiation emitted to the detector based on a property of objects intruding from the environment into an interaction volume of the optical interferometer; and generating an output signal based on the intensity of the electromagnetic radiation emitted to the detector, wherein a further interaction volume of the optical interferometer is oriented basically parallel to the interaction volume, a particle source emits objects with a velocity that depends on a size of the objects, such that the objects emitted from the particle source intrude the interaction volume and the further interaction volume, and a time difference between an object traversing the interaction volume and traversing the further interaction volume is measured, and a size of the object is determined from the measured time difference.

* * * * *